(12) United States Patent
Gobbi et al.

(10) Patent No.: US 11,147,267 B2
(45) Date of Patent: Oct. 19, 2021

(54) METHOD FOR MODULATING THE RELEASE RATE OF MICROENCAPSULATED ACTIVE INGREDIENTS

(75) Inventors: Carlotta Gobbi, Ravenna (IT); Lucio Bassetti, Ravenna (IT); Valerio Borzatta, Bologna (IT); Marco Bernardini, Casalpusterlengo (IT); Francesca Borgo, Lainate (IT); Luigi Capuzzi, Novara (IT)

(73) Assignee: SIPCAM OXON S.P.A., Milan (IT)

( * ) Notice: Subject to any disclaimer, the term of this patent is extended or adjusted under 35 U.S.C. 154(b) by 571 days.

(21) Appl. No.: 12/665,698

(22) PCT Filed: Jun. 27, 2008

(86) PCT No.: PCT/EP2008/005271
§ 371 (c)(1),
(2), (4) Date: Dec. 18, 2009

(87) PCT Pub. No.: WO2009/000545
PCT Pub. Date: Dec. 31, 2008

(65) Prior Publication Data
US 2010/0173781 A1  Jul. 8, 2010

(30) Foreign Application Priority Data

Jun. 28, 2007 (IT) .............................. MI2007A1289

(51) Int. Cl.
*A01N 25/28* (2006.01)

(52) U.S. Cl.
CPC ................................... *A01N 25/28* (2013.01)

(58) Field of Classification Search
None
See application file for complete search history.

(56) References Cited

U.S. PATENT DOCUMENTS

| 5,229,122 A * | 7/1993 | Chadwick et al. ........... 424/408 |
| 2002/0055436 A1* | 5/2002 | Krause et al. ................ 504/118 |

FOREIGN PATENT DOCUMENTS

| EP | 0 203 724 A3 | 12/1986 |
| EP | 0238184 | * 9/1987 |
| EP | 0 238 184 B1 | 10/1991 |
| EP | 0 427 991 B1 | 9/1997 |
| WO | WO 90/08468 A1 | 8/1990 |
| WO | WO 97/13409 A1 | 4/1997 |
| WO | WO 9713409 | * 4/1997 |
| WO | WO 01/84928 A1 | 11/2001 |
| WO | WO 03/092378 A1 | 11/2003 |
| WO | WO 2006/111553 A1 | 10/2006 |
| WO | WO 2006/111839 A1 | 10/2006 |
| WO | WO 2006111553 | * 10/2006 |
| WO | WO-2006111839 | * 10/2006 |

* cited by examiner

*Primary Examiner* — Alton N Pryor
(74) *Attorney, Agent, or Firm* — Arent Fox LLP

(57) ABSTRACT

A method for modulating the release rate of microencapsulated active ingredients comprising the following steps: I) preparation of an aqueous suspension A) comprising microcapsules of at least one active ingredient, II) preparation of a liquid emulsifiable in water, component B), comprising a solvent of the active ingredient and at least a surfactant, III) water, component C), for diluting to the application dose the active ingredient, and mixing A), B) and C).

35 Claims, No Drawings

METHOD FOR MODULATING THE RELEASE RATE OF MICROENCAPSULATED ACTIVE INGREDIENTS

CROSS-REFERENCED TO RELATED APPLICATION

This application is a National Stage entry of International Stage entry of International No. PCT/EP2008/005271, filed Jun. 27, 2008, which claims priority to Italian Patent Application No. MI2007A001289. filed Jun. 28, 2007, the disclosure of the prior application is incorporated in its entirety by reference.

The present invention relates to a method for modulating the release rate of microencapsulated active ingredients (a.i.) and the compositions thereof.

More specifically the present invention refers to a method for releasing agropharmaceutical active ingredients.

Active principle systems with a controlled release are widely widespread in various applications, in particular in agriculture. In this field it is particularly required to reduce the used active substance amount and, in the specific case, of volatile active principles, i.e. of the product released into the air. These controlled release systems also allow an improved ecotoxicological profile and a reduced leaching of the active principles in the water bed. The latter is a typical phenomenon of the liquid formulations, for example, concentrated emulsions and suspensions.

On these grounds, formulations comprising microcapsules and microspheres are more and more widespread.

Numerous encapsulation techniques and microencapsulated compositions have been developed for applications in different fields, as, for example, pharmaceutical industry, graphic arts, etc.

In agriculture, the microencapsulated compositions are mostly formed of polyurea microcapsules obtained by interfacial polymerization of a suitable aromatic isocyanate in association with the suitable diamines. The diamines can be also produced in situ by partial hydrolysis of the isocyanate. See for example U.S. Pat. Nos. 4,280,833, 4,643,764. In these compositions the release of the active ingredient from the capsule takes place by the diffusion of the active ingredient (a.i.) through the capsule shells or by the rupture of the capsule. In order to modify the active ingredient (a.i.) release it is necessary to modify the shell thickness and/or the porosity and/or the sizes of the capsule. These methods show the following drawbacks. Thin shells of the capsule can break, for example for mechanical reasons, causing the complete and sudden release of the active principle from the capsule. Thin and/or too porous shells do not guarantee an efficient insulation of the active principle from the medium where the capsules are suspended. This leads to a high probability of crystallization of the a.i. so that numerous problems during the use can arise and the drawback is that it is needed to stop the application for cleaning the equipments and the spray nozzles.

These microencapsulated formulations are therefore comparable to stabilized emulsions against coalescence and when sprayed they show a release profile so rapid as to be comparable to a conventional emulsifiable liquid.

If the shell thickness is increased in order to slow the release of the a.i. from the capsules, that is negligible and therefore no efficacy of the active is seen.

A variation of the microcapsule size for modifying the release of the active ingredient from the capsule has the same drawbacks indicated above for the thickness variation.

Said methods do not allow to change the release profile once the capsule is formed. Therefore the modulation of the active principle release is impossible.

Another known method for controlling the release rate of active ingredients, as for example encapsulated insecticides and fungicides, consists in incorporating a suitable fluid inside the microcapsule. An example is the method known as Mobisolv and described in "Modification of release rate of encapsulated A.I. through fluid selection", by R. A. Verbelen and S. Lemoine in "Pesticide Formulations and application system", vol. 19, page 65. Also in this case the release cannot be modulated once the microcapsule is formed. As a matter of fact, once the thickness, the porosity and the composition of the microcapsule have been fixed, it is no longer possible to modulate the release rate of the active ingredient in order to change the rate profile thereof.

Another method to control the release of active ingredients in the agrochemical field is to use capsule shell polymers whose permeability can be varied by the microcapsule utilization temperature, as described, for example, in U.S. Pat. No. 5,120,349. This method shows various drawbacks since the number of polymers having said characteristic is rather limited and the release mechanism depends on hardly controllable parameters. As the release of the active depends on the use temperature and on the polymer permeability, the release regulation results a complex operation and hardly to be industrially carried out.

Another method known in the prior art is described in U.S. Pat. No. 6,544,540, wherein the control of the active ingredient release from the capsules takes place by using, as material forming the capsule, a polymer susceptible of rupture in alkaline environment as that of the digestive tract of some arthropods. This method is however limited only to insecticides effective by swallowing. In the other cases the method is not usable.

Generally, the microencapsulation procedures described above are suitable to produce very rapid or very slow releases and however they are not modifiable. Once the thickness, the width, the porosity (or permeability) and the composition of the microcapsule have been fixed, it is not possible any longer to modulate the release rate of the active ingredient in order to change the efficacy profile thereof in view of the final application.

This requirement is highly desired, in particular by the final users since there is a need to modify the release profile of a microencapsulated active principle depending on the application. For example, a herbicide to be used in pre-seed or in pre-emergency applications to the soil typically requires a slow release. On the contrary a fast release is required in case of post-emergency leaf applications. Also in the insecticide field a need is felt to have microencapsulated insecticide compositions having a release that can be modulated since, for example in applications against the ground insects, the release must be slow, while for leaf applications the release of the same insecticide must be fast.

In the prior art for obtaining a combination of effects (immediate and delayed release), it is used for the immediate effect a free active principle (non-encapsulated), in suspension or in emulsion, and an encapsulated active principle for the delayed effect. See for example U.S. Pat. Nos. 5,223,477, 5,049,182 which describe twin-packs formulations or mixtures of microcapsules with dispersions, or emulsions, of active ingredients. These systems show no modulation of the active ingredient release.

These systems can also be used by substituting the free active principle with a free effect modifier, for example an antidote in case of herbicides, or with a synergizing agent in case of insecticides. See for example the formulations described in WO 2006/111,553 and WO 2006/111,839. Also in this case, once the formulation has been prepared, it is not possible to change the release rate of the active principle from the microcapsule.

Another method known in the prior art for changing the release rate of a microencapsulated a.i. provides the use of acid substances capable to break the polymers constituting the capsules as reported in WO 00/05,952. The drawback of this method resides in the complete rupture of the capsules giving an immediate release of the a.i. A further drawback is that it is not possible to have a gradual release and therefore to have a release that can be modulated.

The need was therefore felt to have available a method for modifying the release rate of microencapsulated active ingredients and their biological efficacy by regulating the release depending on the type of application.

The Applicant has unexpectedly and surprisingly found a method capable to solve the above technical problem.

It is an object of the present invention a method for modulating the release rate of microencapsulated active ingredients (a.i.) comprising the following steps:
I) preparation of an aqueous suspension A) comprising microcapsules of at least one active ingredient,
II) preparation of a water-emulsifiable liquid, component B), comprising a solvent of the active ingredient and at least one surfactant,
III) water, component C), for diluting the active ingredient to the application rate,
and mixing A), B) and C).

With the method of the invention the release rate of an active ingredient from the microcapsule of a suspension A) is changed by adding component B). Actually the a.i. release rate is modified by changing the ratio (by weight) solvent of component B)/a.i. of component A). Indeed by increasing this ratio, the release rate of a.i. is increased.

An embodiment of the invention is represented by the addition of A) to B), or viceversa, and the subsequent addition of water of step III). The water of step III) can be added to component A) alone and/or to component B) alone before the mixing of the three components.

It has been surprisingly and unexpectedly found that with the method of the present invention the release rate of the microencapsulated active ingredient depends on the type and on the amount of solvent of step II).

For modulating the a.i. release rate from microcapsules of compositions of the invention, it is sufficient to change the ratio solvent of component B)/a.i. of component A). This can be done by further adding component B) to the compositions A)+B)+C).

The mixture of A)+B) can be in the form of aqueous suspo-emulsion, that is a suspension of the active ingredient in micronized form in an emulsion. In general these mixtures show good stability.

The mixture of A)+B) can also be in the form of aqueous suspo-dispersion, that is a suspension of the active ingredient in micronized form in a dispersion. Another embodiment of the mixtures A)+B) can be an aqueous suspo-microemulsion, that is a suspension of the active ingredient in micronized form in a microemulsion. The person skilled in this field is capable to easily prepare emulsions, dispersions, microemulsions of said suspensions by using the common general knowledge. Generally, for obtaining these various embodiments preferably more than one surfactant is used.

In step II), component B) can also be in the form of an aqueous emulsion.

The ratio between the solvent in component B) and the active ingredient (a.i.) of component A) is selected on the basis of the desired a.i. release rate. As said, the greater this ratio, the higher the a.i. release rate, the other conditions being the same. The latter are for example the composition of component A), the thickness, porosity of capsules and a.i. concentration.

Therefore, it is possible to obtain formulations having release times/rates of the active ingredients which can be regulated depending on the solvent amount of component B).

Preferably said ratio (by weight) is generally comprised between 0.1/1 and 40/1, preferably 0.2/1 and 30/1, more preferably 0.5/1 and 20/1.

The solvent choice mainly depends on the nature of the active ingredient and on the polymeric material forming the capsule. Preferably the solvent is selected among those not containing heterocyclic rings with at least one oxygen atom, those showing an agrochemical activity having an efficacy lower than 70% on target species, in particular as insecticide and/or herbicide and/or acaricide and/or fungicide activity, etc.

Preferably the solvents of the present invention are selected from those having the following characteristics:
capability to solubilize the active ingredient at room temperature (25° C.) for at least 5% w/w, preferably 10%, more preferably at least 20%,
inertia with respect to the capsule shells, for example they do not cause rupture or swellings of the capsule,
substantial immiscibility with water.

Generally the inertia with respect to the capsule shells is estimated according to the following test: the solvent is allowed to be in contact with the encapsulated active principle for 48 hours at room temperature (25° C.): neither rupture nor substantial swelling must occur.

Generally the solvent is not very volatile, for example volatility<0.10 according to ASTM D3539 (butylacetate=1); or volatility>100 according to DIN 53170, ethyl ether being=1.

As solvents, it can for example be mentioned:
$C_9$-$C_{20}$ alkylbenzenes, preferably $C_{10}$-$C_{16}$, and their mixtures, wherein the alkyl can be linear or branched. For example Solvesso® 150, Solvesso® 200, Solvesso® 150 ND, Solvesso® 200 ND, preferably in the versions free from naphthalene residues as Solvesso® 150 ND, Solvesso® 200 ND, can be mentioned;
$C_1$-$C_4$ alkyl esters of $C_3$-$C_{14}$ dicarboxylic acids, as for example dimethyl glutarate, dimethyl succinate, dimethyl adipate, dimethyl sebacate, diisopropyl myristate or their mixtures, preferably DBE (a mixture containing 55-65% w/w of dimethyl glutarate, 15-25% of dimethyl succinate and 10-25% of dimethyl adipate);
$C_3$-$C_{10}$ alkyl esters of $C_3$-$C_{10}$ carboxylic acids or hydroxyacids, as for example Purasolv® EHL (ethylhexyl lactate);
methyl esters of $C_{12}$-$C_{22}$ saturated or unsaturated fatty acids or their mixtures, preferably oleic acid and linoleic acid or their mixtures, for example biodiesel;
$C_7$-$C_9$ alkyl esters of acetic acid, for example heptylacetate (Exxate® 700, Exxate® 900).

These classes of solvents are particularly suitable in case of polyurea, polyamide, polyurethane capsules.

The emulsifiable liquid, component B), is a mixture, preferably homogeneous, comprising the solvent for at least 50% w/w, preferably at least 70%, still more preferably for at least 80%, and non-ionic surfactants for the remaining parts to 100, preferably in admixture with anionic surfactants.

Examples of non-ionic surfactants are alkylarylphenols, preferably ethoxylated as for example ethoxylated tristyrilphenols, ethoxylated fatty alcohols, ethoxylated castor oil, ethoxylated sorbitan oleate wherein the ethoxylated units can be from 1 to 60, preferably from 5 to 40.

As examples of anionic surfactants, sulphonates, sulphosuccinates, etc., in particular dodecylbenzensulphonates, for example Geronol® 60 BE, or dioctylsulphosuccinate, preferably as salts, for example Ca, Na salts or ammine salts, can be mentioned.

The active ingredient release starts when the formulation is applied. The a.i. release rate is determined by the method reported in the characterization.

By application rate of the a.i. of the compositions of the invention it is meant an agronomically effective amount of a.i. diluted in water. Generally the water amount ranges from 50 to 2,000 l/ha depending on the equipment used for the application: in case of insecticides, preferably between 600 and 1,200 l/ha; in case of herbicides preferably between 200 and 600 l/ha.

Suspensions A) generally contain microcapsules suspended in water having an a.i. concentration ranging from 1% up to 60% w/w, preferably from 2.5% to 55%, more preferably from 5% to 45%.

Suspensions A) of step I) can be prepared according to known techniques or are commercially available. They usually comprise polymeric microcapsules having an average diameter from 1 to 30 micron, preferably from 2 to 20 micron. The microcapsules comprise a core of at least an active ingredient and a shell of polymeric material.

The shell is formed of a polymeric membrane insoluble in water generally obtainable by interfacial in situ polymerization. Preferably the polymers are those obtained by polycondensation. Polyamides, polyesters, polyurethanes, polyureas, more preferably polyureas, can be mentioned.

The active ingredient is typically a crop protection product and can be selected from herbicides, acaricides, insecticides, fungicides, biocides, plants and insects growth regulators, antidotes.

Among herbicides, those belonging to the classes of dinitroanilines, chloroacetamides, carbamates, and diphenylethers can for example be cited. In particular it can be mentioned:
  among dinitroanilines, for example, pendimethalin and trifluralin;
  among chloroacetamides, for example, alachlor, acetochlor, dimethenamide, metolachlor, pethoxamide, pretilachlor;
  among carbamates, for example, molinates, triallates, EPTC;
  among diphenylethers, for example, oxyfluorfen.

Other usable herbicides are flurochloridone, clomazone, dichlobenil. Oxyfluorfen is particularly preferred.

Among acaricides, those of the METI class, as for example fenazaquin and pyridaben, can be mentioned.

Among insecticides, those belonging to the classes of pyrethroids, neonicotinoids, carbamates and organo-phosphates, can for example be mentioned. In particular it can be cited:
  among pyrethroids, for example, bifenthrin, α-cypermethrin, cypermethrin, deltamethrin, imiprothrin, λ-cyhalothrin, prallethrin, tetramethrin, preferably bifenthrin, α-cypermethrin, deltamethrin and λ-cyhalothrin;
  among organophosphates, for example, phosmet, chlorpyriphos, naled, fenitrothion;
  among neonicotinoids, for example, imidachloprid;
  among carbamates, for example, carbosulfan, pyrimicarb, aldicarb, thiodicarb, carbofuran and propoxur, preferably carbosulfan.

Among fungicides, those of the imidazole class, as for example imazalil, of the triazole class, as for example tetraconazole, tebuconazole, propiconazole and those of the anilinopyrimidine class, as for example pyrimethanil, can be mentioned.

Among the growth regulators, pyriproxifen can be mentioned.

The active ingredient in the microcapsules can also be in admixture with other a.i. of the same or different class.

Other components of the microcapsule core are, for example, solvents, activity modifiers, etc. The solvents are preferably those previously described in component B) or those contained in the commercial microcapsules. The activity Modifiers are those described hereinafter.

Suspensions A) can contain, in addition to the microcapsules, other components, as for example, dispersants and excipients as thickeners, antifoam, antifreeze, antimould and activity modifiers, etc.

Among dispersants, ligninsulphonates, for example sodium ligninsulphonates, for example Reax® 100M, Reax® 88 B and Ultrazine® NA, and calcium ligninsulphonates, for example Borrement® CA, block polymers containing ethylenoxide and/or propylenoxide blocks, for example Pluronic® 10400, polycarboxylates, for example sodium polycarboxylates, for example Geropon® TA 72 can be mentioned.

Among thickeners, the xanthan gum (Rhodopol®) can be mentioned; among antifoams silicone compounds, as for example Defomex® 1510, can be mentioned. Among antifreezes, inorganic salts as calcium nitrate, sodium carbonate, can be mentioned; as antimoulds, substituted triazines, as for example Amebact® C, and benzoisothiazolinones as for example Proxel® GXL, can for example be mentioned.

By activity modifiers, compounds capable to modify the activity of the encapsulated active ingredient are meant. It can be mentioned, for example:
  "safener" (antidote), for example furylazole, cloquintocet-mexyl, in case of herbicides;
  synergizing agents of the active ingredient as for example PBO (piperonylbutoxide), in particular in case of insecticides and fungicides, or in case of herbicides;
  sexual pheromones, cairomones, in case of insecticides.

Suspensions A) used in the method of the present invention can be prepared according to known techniques in the prior art. See, for example, patent applications WO 2006/111,553 and WO 2007/039,055.

Component B) is prepared, for example, by mixing the solvent with surfactants, for example those described for component A), obtaining a stable emulsifiable liquid. Preferably the surfactants are not cationic. The component B) is a water-emulsifiable liquid according to the present invention if, after having been put in water, forms a stable emulsion according to the CIPAC MT 36 method.

Component B) can optionally contain activity modifiers as described above.

As said, the method of the present invention allows to modify the release rate of microencapsulated active ingredients depending on the final application. This is advantageous as it is possible to change the biological efficacy profile of the initial formulation A) by additions of solvent in the form of aqueous emulsion or emulsifiable liquid.

Therefore with the method of the present invention the release rate of a given microencapsulate formulation is adjustable and easily modifiable by adding component B).

As said, components A), B), C) can be mixed in various ways. One consists in separately adding component B) and component A) to component C). Preferably component C) is maintained under stirring, for example by a recycle pump or a stirrer. Preferably the stirring is slow. Components A) and B) can be added at the same time or in sequence. The order of addition is not important. Preferably C) is contained in the spraying equipment of the end user. In the final mixture the active ingredient concentration corresponds to the agronomically effective rate. The compositions of the invention A)+B)+C) are defined ready-to-use diluted compositions. The compositions show a sufficient stability for the application. Generally this stability is from 1 to about 3 days.

A second embodiment comprises adding B) to suspension A), or viceversa, preferably under stirring, more preferably under low stirring for avoiding microcapsule rupture, for example by blade stirrer, more preferably with a rotation rate lower than 1,000 rpm. The obtained mixture is considered not diluted according to the present invention. This composition A)+B) show a high stability, in fact it passes the CIPAC MT 46 test. This corresponds to a stability, at room temperature (25° C.), of at least 2 years. The undiluted mixtures A)+B) substantially show, indeed, the same stability of suspensions A).

The composition A)+B) is then diluted with water (addition of component C)) by the end user up to the application rate of the active ingredient (agronomically effective dose).

As said, these compositions A)+B)+C) show a modulating release when the ratio solvent of component B)/a.i. is changed. For example by increasing the ratio it is increased the a.i. release.

The Applicant has surprisingly and unexpectedly found that the undiluted mixtures A)+B) do not show any a.i. release. This fact is unexpected and surprising since the solvent is present outside the microcapsules. The a.i. release occurs only after the distribution on the field of the mixture A)+B) diluted with C).

As said, components A) and B) are present in the undiluted compositions in amounts such as to obtain the desired release degree when component C) is added. In this composition A)+B) the ratio solvent of component B)/a.i. of component A) is selected depending on the release rate desired. By raising the ratio solvent of component B)/a.i. of component A), the a.i. release increases.

Particularly preferred compositions A)+B) are the following:
A) suspension of microcapsules in polyurea comprising an herbicide, preferably oxyfluorfen,
B) a mixture containing:
    90% w/w of Solvesso® 200,
    10% w/w of a mixture of non-ionic and anionic surfactants, preferably Geronol® FF6 and Geronol® FF475,
the ratio by weight between solvent of component B) and a.i. of component A) being comprised between 0.1:1 and 1:1, preferably between 0.2:1 and 0.8:1.

In case of insecticides, examples of preferred compositions A)+B) are:
A) suspension of microcapsules in polyurea comprising an insecticide, preferably λ-cyhalothrin,
B) a mixture containing:
    90% w/w of Solvesso® 200,
    10% w/w of a mixture of non-ionic and anionic surfactants, preferably Geronol® FF6 and Geronol® FF475,
or
a mixture containing:
    90% w/w of biodiesel, preferably Phytorob® 926,65,
    10% w/w of a mixture of non-ionic and anionic surfactants, preferably 1:1 mixture of Geronol® TE 777 (non-ionic-anionic surfactant mixture) and Geronol® 60 BE (anionic surfactant),
the ratio by weight between solvent of component B) and a.i. of component A) being comprised between 0.2:1 and 6:1, preferably 0.5:1 and 4:1, more preferably 0.8:1 and 2:1.

The compositions A)+B) can also be commercialized in separated containers and mixed when desired.

The compositions diluted to the application dose of the a.i. of the present invention are ready-to-use as herbicides, acaricides, insecticides, fungicides, biocides, growth regulators, antidotes, etc.

A further object of the present invention is the use of the compositions of the invention in herbicide, insecticide, fungicide applications comprising the use of a composition A)+B) diluted with C).

The application of said compositions is typically on the field or on the plant.

It has been surprisingly and unexpectedly found that the compositions of the invention diluted to the application dose show a better biological efficacy. As a matter of fact it has been found that the addition of component B) allows to increase the a.i. biological activity. In case of herbicides this implies an increase of the biological activity in post-emergency, i.e when the culture and the weeds have already emerged.

In case of insecticides, growth regulators, fungicides, herbicides, the modulation of the a.i. release implies an improved biological activity depending on the application and/or the level of the patogen characteristics. The composition of the invention can therefore be successfully used to avoid resistance phenomena.

Some illustrative, but not limitative, examples of the present invention follow.

EXAMPLES

Characterization
Method for the Analytical Kinetic Determination of the Active Ingredient Release from the Microcapsules The method consists in placing a known amount of a formulation, previously diluted in water up to the application dose, on Teflon sheets and in the measurement of the active ingredient outside the microcapsule, at prefixed time (1, 2, 4, 6, 18, 24 hours) by extracting at each time the active ingredient released from the capsules with a suitable extraction solvent such as, for example, n-hexane.

The procedure followed for the polyurea capsules was the following.
1) The formulation obtained according to the procedure described in the examples is diluted in distilled water until obtaining a suspension containing from 5 to 100 g of a.i./1,000 l of water (preferably 10-20 g/1,000 l).
2) 1 ml of the diluted suspension prepared in 1) is placed on a Teflon sheet having 6.5×5×0.02 cm sizes.
3) At fixed times, the Teflon sheet is transferred inside a 300 ml flask together with 50 ml of a solvent able to solubilize the a.i., but which does not affect the stability of the polymeric microcapsules. The solvent is reported in the examples.
4) The active principle released from the capsules is then extracted by shaker stirring for 5 minutes.
5) The organic solution is filtered on 0.45 μm filter, 6) The a.i. % in the extraction solvent is determined by the analytical method reported in the examples.

The procedure is repeated at different times, for example, 1, 2, 4, 6, 18 and 24 hours, by using a new Teflon sheet each time. On the basis of the analytical results, the release kinetics are drawn up, by reporting the relative % of the a.i. released from the capsule with the time. As relative % it is meant the amount of a.i. released from the capsule, related to the initial concentration of the same in the starting formulation. The relative % can be calculated according to the following formula:

% rel=$C/C_F$×100 wherein:
  C=a.i. concentration released from the capsules, as determined at point 6);
  $C_F$=concentration of microencapsulated a.i. in the formulation.

Formulation Stability at the Dilution

The stability at the dilution is evaluated by suspensibility measurements (sedimentation) determined through the method CIPAC MT 161. The greater the suspensibility (<sedimentation), the higher the composition stability.

Accelerated Stability Test of the Suspension

This test is used for evaluating the behaviour of the suspensions at room temperature (25° C.) for times over 1 year. It is assumed that 1 day at 54° C. corresponds to 1 month at room temperature.

According to the standard test CIPAC MT 46, after 14 days of formulation storage at 54° C. (ageing test) the formulation characteristics (content, encapsulation efficiency) are again measured.

Bioassay Method

The biological activity of the formulations is evaluated in laboratory on a suitable species of insect by using a known and largely used method, called "leaf dip bioassay method". This is described for example by Cahill, M. et al, Bull. Entomol. Res. 85, 181-187, 1995. Cotton plants, grown without being exposed to insecticides, are cut in the form of disks having 4 cm diameter. These disks are dipped in the insecticide water solution, containing also 0.01% of Agral® (non-ionic surfactant), and then dried at room temperature. The insecticide solutions are selected and prepared to obtain a mortality range between 0 and 100%. The control leaves are dipped in a solution formed of Agral 0.01% in distilled water. Once dried, the disks are positioned on agar (0.5%) in a petri (3 cm diameter, 1.5 cm depth). About 20 adult insects are placed on the treated cotton disks and left at 25° C. for 24 hours. The live insects are counted at zero time, after 24 and 48 hours in order to verify the mortality %.

Potter Precision Laboratory Spray Tower

The efficacy of the formulations was also tested using a Potter Precision Laboratory Spray Tower (as described in "Laboratory apparatus for applying direct sprays and residual films", The Annual of Applied Biology, vol. 39, No. 1, Mar. 1, 1952).

Test organisms were placed in a Petri dish (10-15 adults/replicate). The spray tower was calibrated with deionised water before application by adjusting the spraying pressure, application speed and type of nozzle to provide an output 2 mg/cm$^2$±10% (200 l/ha). The applied amount was determined by weighing glass plates as reference before and immediately after treatment. After the calibration step the Petri dishes were sprayed with deionised water (for the untreated control) and then with the test items solutions (starting from the low concentration). The sprayer equipment was rinsed several times with deionised water among the different application of the products. The condition of the test organisms were observed at different times, for example 30', 1 h, 3 h, 24 h after treatment (AT).

Example 1

Compositions Comprising Variable Release Oxyfluorfen Microcapsules

Step a): Preparation of Suspension A)

To 20.0 g of Solvesso® 200 (mixture of $C_9$-$C_{16}$ alkylbenzenes having a distillation range within 226-284° C.) contained in a vessel equipped with stirrer, 17.2 g of oxyfluorfen having a 97% w/w purity are added; the mixture is heated to 50° C., while maintaining it under stirring until complete homogeneization. Then, under stirring, 2.61 g of Voronate® M 220 (isocyanate MDI) are added.

In the meantime 1.1 g of dispersant Borrement CA are dispersed in 44.28 g of water and the above prepared organic mixture is added thereto, by stirring through Turrax at the maximum speed, equal to 10,000 rpm, for about 2 minutes, obtaining an oil/water emulsion.

Then, under stirring, by means of a blade stirrer at 800 rpm, 2.51 g of an aqueous solution containing 40% w/w of hexamethylendiamine are added.

The so obtained mixture is transferred in a reactor maintained at 50° C. After few minutes the formulation is completed by addition of 4.0 g of a thickener (Rhodopol® 23 pregelled at 2.7% w/w in water and containing 1 g of Proxel® GXL as antimould agent), 0.2 g of antifoam agent Defomex® 1510 and allowed to cure for 4 hours at 50° C.

Then it is cooled to room temperature and 10.0 g of calcium nitrate are added. A suspension of microcapsules having a concentration of active principle of 180 g/l is obtained. This is then subjected to the above characterization obtaining the following results:

| granulometry | |
| --- | --- |
| 50% | <5 micron |
| 90% | <20 microneization | stability at the dilution
  suspensibility>90%

The accelerated stability test of the microcapsule suspension is carried out as described in the characterization. The test confirms the chemico-physical stability of the suspension A).

Step b): Preparation of Mixture A)+B)

10 parts by weight of a mixture B), formed for 90% w/w of Solvesso® 200 and for the remaining part of a mixture 1:1 w/w of Geronol® FF6 and Geronol® FF475, are added under slow stirring to 90 parts by weight of the suspension A). The weight ratio between solvent of component B) and a.i. of component A) is 0.6:1 and the a.i. concentration in the mixture A)+B) is 15% by weight.

The accelerated stability test of the composition A)+B) is carried out as described in the characterization. The test confirms the chemico-physical stability of the composition A)+B).

The compositions A) and A)+B) are diluted with water until obtaining an a.i. concentration equal to 1.3 g/l. By using the described procedure and n-hexane as extraction solvent, the content of a.i. released is determined by GC-ECD (electron capture detector). Repetitions are carried out after prefixed time intervals obtaining the results reported hereinafter.

| Time (h) | A) (a.i. %) | A) + B) (a.i. %) |
|---|---|---|
| 1 | 0.34 | 1.22 |
| 2 | 0.29 | 2.6 |
| 4 | 0.36 | 3.9 |
| 8 | 0.29 | 5.5 |

The comparison of the release data shows that the diluted suspension A) has a substantially constant release with the time, while the addition of solvent B) to A) allows to significantly increase the release of the active principle with the time.

Example 2

Field Tests
Application in post-emergency of the composition of example 1.

The formulation A)+B) has been diluted with water until obtaining an application rate of 240 g of the a.i./ha. The water volume used was 350 l/ha.

A single application in post-emergency has been effected by means of a knapsuck spraying PULVAL. The application has been carried out with 3 m long spraying bar equipped with 6 nozzles TJ 80015 VS which allowed to obtain an uniform distribution of the product tested.

The evaluation of herbicide activity has been made on the following infesting grasses:
MATRICARIA CAMOMILLA (MAT.CH);
VERONICA HEDERAEFOLIA L. (VER.HE);
PAPAVER RHOEAS (PAP.RH).

The herbicide activity of the formulation found on the sown ground is reported in the following table

| Infestant | Activity |
|---|---|
| VER. HE. | 100% |
| PAP. RH. | 100% |
| MAT. CH. | 100% |

The results show that the diluted composition A)+B) has a very good herbicide activity (100%) in post-emergency phase on all the tested infestants even maintaining a low phytotoxicity on the target culture (barley).

Example 3

Compositions Comprising Variable Release Pendimethalin Microcapsules

Following the procedure as in example 1 a commercial pendimethalin microcapsules suspension A), (MOST MICRO®), with an a.i. concentration equal to 31.7% w/w is mixed with the component B) as described in example 1 in the following amounts (parts and % by weight):
formulation 3A
76 parts by weight of A) 24 parts by weight of B) (a.i.=24% w/w of A)+B)) ratio by weight between the solvent of component B) and the a.i. of A) 1:1, formulation 3B
44 parts by weight of A) 56 parts by weight of B) (a.i.=14% w/w of A)+B)) ratio by weight between the solvent of component B) and the a.i. of A) 4:1.

Composition A) and the compositions A)+B) are diluted with water until obtaining a pendimethalin concentration equal to 3 g/l.

Following the procedure described in the characterization and by using n-hexane as extraction solvent, the content of the a.i. released at the different times is determined by GC-ECD technique.

| | | Ratio a.i./B) (by weight) | |
|---|---|---|---|
| | | 1:1 | 1:4 |
| Time (h) | A) (a.i. %) | [A) + B)]$_1$ (a.i. %) | [A) + B)]$_2$ (a.i. %) |
| 1 | 5.4 | 6.2 | 7.1 |
| 2 | 6.0 | 7.4 | 8.8 |
| 8 | 6.2 | 9.0 | 14.8 |

The release data show that the addition of the solvent as component B) to suspension A) allows to significantly increase the a.i. release.

Example 4

Compositions Comprising Variable Release λ-Cyhalothrin Microcapsules
Step a): Preparation of Suspension A)

To 20.0 g of Solvesso® 200 (mixture of $C_9$-$C_{16}$ alkylbenzenes having a distillation range in the range 226-284° C.) contained in a vessel equipped with stirrer, 20.6 g of λ-cyhalothrin having a 97% purity are added; the mixture is heated to 50° C., by maintaining under stirring until complete homogeneization. Then, always under stirring, 1.42 g of Voronate® M 220 (isocyanate MDI) are added.

In the meantime 1 g of calcium ligninsulphonate dispersant, Borrement CA, are dispersed in 44.11 g of water and the above prepared organic mixture is added thereto, by stirring through Turrax at the maximum speed, equal to 10,000 rpm, for about 2 minutes, obtaining an oil/water emulsion.

Then, under stirring by means of a blade stirrer at 800 rpm, 1.37 g of an aqueous solution containing 40% by weight of hexamethylendiamine are added.

The mixture is then transferred in a reactor maintained at 50° C. After few minutes the formulation is completed by addition of 2 g of thickener (Rhodopol® 23 pregelled at 2.7% w/w in water and containing 1 g of Proxel® GXL as antimould agent), 0.2 g of antifoam agent Defomex® 1510 and 0.3 g of Antarox® TSP/461 and allowed to mature for four hours at 50° C.

After 4 hours, 9 g of calcium nitrate are added and it is cooled to room temperature.

A suspension of microcapsules having an a.i. concentration equal to 200 g/l is obtained.

This is then subjected to the described characterization obtaining the following results (% of the microcapsules):

| Granulometry | |
|---|---|
| 50% | <5 micron |
| 90% | <20 micron |

Stability at the dilution
Suspensibility>90%

The accelerated stability test of the microcapsule suspension was then carried out as described in the characterization. The test confirms the chemico-physical stability of the suspension A).

Step b): Preparation of Mixture A)+B)
Formulation 4A 15 parts of a mixture B), formed for 90% by weight of Solvesso® 200 and for the remaining part of a mixture of Geronol® FF6 and Geronol® FF475 in a weight ratio 1.5:1 are added under low stirring to 75 parts by weight of the previously prepared suspension A) and then 10 parts by weight of water are added so as to obtain a composition containing 150 g/l of a.i. The weight ratio of the solvent of component B) : a.i. of component A) is 1:1.

Formulation 4B

Another formulation is prepared formed of 50 parts by weight of suspension A), 40 parts by weight of mixture B) and 10 parts by weight of water so as to obtain a composition containing 100 g/l of a.i. The weight ratio between the solvent of component B) : a.i. of component A) is 4:1.

The accelerated stability test is carried out on the two formulations 4A and 4B as described in the characterization. The test confirms the chemico-physical stability of the formulations.

The suspension A) and the two formulations 4A and 4B are then diluted with water until obtaining an a.i. concentration equal to 250 mg/l.

The results of the a.i. release for the formuation 4A are reported in example 7, for formuation 4B are reported in example 8.

Example 5

Compositions Comprising Variable Release λ-cyhalothrin Microcapsules

Step a): Preparation of Suspension A)

20.6 g of λ-cyhalothrin having a 97% w/w purity are added to 20.0 g of Solvesso® 200 contained in a vessel equipped with a stirrer. The mixture is heated to 50° C. under stirring until complete homogeneization. Then, under stirring, 2.84 g of Voronate® M 220 (isocyanate MDI) are added.

In the meantime 1 g of calcium ligninsulphonate dispersant, Borrement CA, is dispersed in 44.11 g of water and the above prepared organic mixture is added thereto, by stirring through Turrax at the maximum speed equal to 10,000 rpm for about 2 minutes, obtaining an oil/water emulsion.

Then, under stirring, by means of a blade stirrer at 800 rpm, 2.73 g of an aqueous solution containing 40% w/w of hexamethylendiamine are added.

The mixture is then transferred into a reactor maintained at 50° C. After few minutes the formulation is completed by addition of 2 g of thickener (Rhodopol® 23 pregelled at 2.7% w/w in water and containing 1 g of Proxel® GXL as antimould agent), 0.2 g of antifoam agent Defomex® 1510 and 0.3 g of Antarox® TSP/461 and allowed to mature for four hours at 50° C.

Then 9 g of calcium nitrate are added and it is cooled to room temperature.

A suspension of microcapsules having an a.i. concentration equal to 200 g/l is obtained.

This is then subjected to the described characterization obtaining the following results:

| Granulometry | |
| --- | --- |
| 50% | <5 micron |
| 90% | <20 micron |

Stability at the Dilution
  suspensibility>90%

The accelerated stability test of the microcapsule suspension has been carried out as described in the characterization. The test confirms the chemico-physical stability of the suspension A).

Step b): Preparation of Mixture A)+B)
Formulation 5A 15 parts by weight of a mixture B), formed for 90% w/w of Solvesso® 200 and for the remaining part of a mixture of Geronol® FF6 and Geronol® FF475 in a weight ratio 1.5:1, are added under low stirring to 75 parts by weight of suspension A). Then 10 parts by weight of water are added to obtain a composition containing 150 g/l of a.i.: The weight ratio component B):a.i. is 1:1. Then the composition A) and the composition A)+B) are diluted with water until obtaining an a.i. concentration equal to 250 mg/l.

By using the previously described procedure and n-hexane as extraction solvent, the content of active ingredient released at the different times is determined by GC-ECD technique:

| Time (h) | A) (a.i. %) | Formulation 5A (a.i. %) |
| --- | --- | --- |
| 2 | 1.35 | 8.6 |
| 4 | 1.52 | 11.4 |
| 6 | 1.5 | 11 |
| 8 | 1.5 | 13.5 |

The release data show that the addition of the solvent of component B) in the form of emulsifiable liquid to suspension A) allows to significantly increase the a.i. release.

Example 6

Compositions of Variable Release Microcapsules Comprising λ-cyhalothrin and Biodiesel Step a): Preparation of Suspension A)

The preparation of example 5 has been repeated but by replacing Solvesso® 200 with Biodiesel.

Step b): Preparation of Mixture A)+B)
Formulation 6A 15 parts by weight of a mixture B), formed for 90% by weight of Biodiesel and for 10% by weight of a mixture of Geronol® TE 777 and Geronol® FF475 in a weight ratio 1:1, are added to 75 parts by weight of the previously prepared suspension A) under low stirring. Then 10 parts by weight of water are added so as to obtain a composition containing 150 g/l of a.i. The ratio solvewnt of component B)/a.i. of component A) is 1:1. Then composition A) and composition A)+B) are diluted with water until obtaining an a.i. concentration equal to 250 mg/l.

By using the described procedure and n-hexane as extraction solvent, the content of a.i. released at the different times is determined by GC-ECD technique.

| Time (h) | A) (a.i. %) | Formulation 6A (a.i. %) |
| --- | --- | --- |
| 4 | 6.8 | 25 |
| 6 | 9.3 | 37 |
| 8 | 14.5 | 52 |

Example 7

Following the procedure described in the characterization and by using n-hexane as extraction solvent, the content of a.i. released at the different times is determined by GC-ECD technique:

| Ratio a.i./B) Time (h) | (by weight) A) (a.i. %) | 1:1 Formulation 4A (a.i. %) |
|---|---|---|
| 2 | 20.4 | 23.5 |
| 4 | 26.8 | 51.4 |
| 6 | 27.8 | 70.8 |

The release data show that the addition of the solvent of component B) in the form of emulsifiable liquid to suspension A) allows to significantly increase the a.i. release.

Example 8

Following the procedure described in the characterization and by using n-hexane as extraction solvent, the content of active ingredient released at the different times is determined by GC-ECD technique:

| Ratio a.i./B) Time (h) | (by weight) A) (a.i. %) | 1:1 Formulation 4A (a.i. %) | 1:4 Formulation 4B (a.i. %) |
|---|---|---|---|
| 2 | 20.4 | 23.5 | 35.5 |
| 4 | 26.8 | 51.4 | 82.1 |
| 6 | 27.8 | 70.8 | 85.4 |

The release data show that the addition of the solvent of component B) in the form of emulsifiable liquid to suspension A) allows to significantly increase the a.i. release. Furthermore, as the ratio solvent of component B)/a.i. of component A) rises, the a.i. release increases.

Example 9

Compositions Comprising Variable Release Microcapsules of α-cypermethrin

Step a): Preparation of Suspension A)

The procedure described in example 1 is repeated but using the following compounds in the amounts specified:

| α-cypermethrin (98% w/w) | 10.2 g |
|---|---|
| Purasolv ® EHL | 26.0 g |
| Voronate ® | 2.58 g |
| HMDA at 40% w/w | 2.48 g |
| Borrement ® CA | 1.1 g |
| Calcium nitrate | 10.0 g |
| Water | 44.04 g |

Microcapsules are obtained having an a.i. content of 10% w/w.

Then suspension A) of microcapsules containing 5% w/w of α-cypermethrin is prepared by using the following compounds (% w/w):

| formulation of microcapsules | 50 |
|---|---|
| Defomex ® 1510 | 0.2 |
| Rhodopol ® 23 (pregel at 2.7% w/w) | 6 |
| Water | 43.8 |

Step b): Preparation of Mixture A)+B)
Formulation 9A 56.6 parts by weight of component B), constituted by a mixture of 80% w/w of 2-ethyihexyl lactate (Purasolv® EHL) and of 20% w/w of a mixture 4:1 (w/w) of Geronol® FF6 and Geronol® FF475, are added to 44.4 parts by weight of suspension A) of step a). The a.i. content in the mixture A)+B) is 2.2% w/w and the weight ratio between solvent of component B) and a.i. of component A) is 20:1.

Composition A) and the mixture A)+B) are then diluted with water until obtaining an a.i. concentration equal to 20 mg/l.

By using the described procedure and n-hexane as extraction solvent for the a.i., the content of a.i. released at the different times is determined by GC-ECD technique:

| Time (h) | A) (a.i. %) | Formulation 9A (a.i. %) |
|---|---|---|
| 24 | 44 | 85 |

The release data show that the addition of the solvent of component B) in the form of emulsifiable liquid to suspension A) allows to significantly increase the a.i. release.

Example 10

Step b) of example 9 was repeated but using Solvesso® 200 instead of Purasolv® in the same amount and a ratio 1:1 (w/w) of Geronol® FF6 and Geronol® FF475. 52.6 parts by weight of component B) are added to 47.4 parts by weight of suspension A) of example 9.

The a.i. content in the mixture A)+B) is 2.4% w/w and the weight ratio between solvent of component B) and a.i. of component A) is 20:1.

Composition A) and the mixture A)+B) are then diluted with water until obtaining an a.i. concentration equal to 20 mg/l.

By using the described procedure and n-hexane as extraction solvent for the a.i., the content of active ingredient released at the different times is determined by GC-ECD technique:

| Time (h) | A) (a.i. %) | A) + B) (a.i. %) |
|---|---|---|
| 18 | 44 | 52 |
| 24 | 44 | 61 |

The release data show that the addition of the solvent of component B) in the form of emulsifiable liquid to suspension A) allows to significantly increase the a.i. release.

Example 11

To 45.9 parts by weight of A) of example 9 is added component B) formed of:
25.4 parts by weight of component B) of example 10,
28.7 parts by weight of component B) of example 9.
The a.i. content in the mixture A)+B) is 2.3% w/w; the weight ratio between the solvent of component B) and the a.i. of component A) is 20:1.

Composition A) and the mixture A)+B) are then diluted with water until obtaining an a.i. concentration equal to 20 mg/l.

By using the previously described procedure and n-hexane as extraction solvent for the a.i., the content of active ingredient released at the different times is determined by GC-ECD technique:

| Time (h) | A) (a.i. %) | A) + B) (a.i. %) |
|---|---|---|
| 18 | 44 | 67 |
| 24 | 44 | 70 |

The release data show that the addition of the solvent of component B) in the form of emulsifiable liquid to suspension A) allows to significantly increase the a.i. release.

Example 12

Compositions Comprising Variable Release Bifenthrin Microcapsules
Step a): Preparation of Suspension A)
The procedure described in example 1 was repeated but using the following compounds in the listed amounts:

| Bifenthrin (96% w/w) | 15.6 g |
|---|---|
| Purasolv ® EHL | 15.0 g |
| Voronate ® | 2.14 g |
| HMDA at 40% w/w | 2.06 g |
| Reax ® 88 B | 1.1 g |
| Calcium nitrate | 9.0 g |
| Water | 51.9 g |

An aqueous suspension is obtained having an a.i. content equal to 16% w/w.

The following components are added to this formulation as reported:

| Microcapsule formulation | 66.7% |
|---|---|
| Defomex ® 1510 | 0.2% |
| Rhodopol ® 23 (pregel at 2.7% w/w) | 5% |
| Proxel ® GXL | 0.1% |
| Water | 28% | obtaining an aqueous suspension A) of microcapsules containing 10% w/w of a.i.
Step b): Preparation of Mixture A)+B)
71.4 parts by weight of component B) of example 9 are added to 28.6 parts weight of as above prepared component A). The a.i. content in the mixture A)+B) is 2.8% w/w and the weight ratio between the solvent of component B) and a.i. of component A) is 20:1.

Suspension A) and the mixture A)+B) are then diluted with water up to a concentration equal to 20 mg/l.

By using the previously described procedure and n-hexane as extraction solvent for the a.i., the content of the a.i. released is determined by GC-ECD technique:

| Time (h) | A) (a.i. %) | A) + B) (a.i %) |
|---|---|---|
| 24 | 37 | 100 |

The release data show that the addition of the solvent of component B) in the form of emulsifiable liquid to suspension A) allows to significantly increase the a.i. release.

Example 13

Example 12 has been repeated by using 31.1 parts by weight of A) and 68.9 parts by weight of the component B) of example 1. The a.i. content in the mixture A)+B) is 3.1% w/w and the weight ratio between the solvent of component B) and a.i. of component A) is 20:1.

The results of the a.i. release for this formuation are reported in example 14.

Example 14

The formulation of example 13 has been characterized for the determination of the a.i. content by using the described procedure and n-hexane as extraction solvent for the a.i., by using GC-ECD technique. The results are the following:

| Time (h) | A) (a.i. %) | A) + B) (a.i. %) |
|---|---|---|
| 24 | 37 | 100 |

The release data show that the addition of the solvent of component B) in the form of emulsifiable liquid to suspension A) allows to significantly increase the a.i. release.

Example 15

Compositions Comprising Variable Release λ-cyhalothrin Microcapsules
Step a): Preparation of Suspension A)
Example 5 is repeated by using the following ingredients and quantities:

| λ-cyhalothrin (97% w/w) | 26.0 g |
|---|---|
| Solvesso ® 200 | 15.0 g |
| Voronate ® M220 | 2.87 g |
| Borrement CA | 1.0 g |
| HMDA at 40% w/w | 2.76 g |
| Water | 41.0 g |

The following components are added to the so obtained formulation:

| Rhodopol ® 23 (pregel at 2.7% w/w) | 2 g |
|---|---|
| Proxel ® GXL | 1 g |
| Defomex ® 1510 | 0.2% |

The mixture is allowed to mature for four hours at 50° C. Then 9 g of calcium nitrate are added and it is cooled to room temperature. A suspension of microcapsules having a.i. concentration equal to 250 g/l is obtained.

The accelerated stability test of the microcapsule suspension has been carried out as described in the characterization. The test confirms the chemico-physical stability of the suspension A).
Step b): Preparation of Composition A)+B)
Component B) is a mixture formed by:
16.6% w/w Biodiesel,
2.5% w/w of a mixture constituted by Geronol® FF6 and Geronol® FF475 in a weight ratio 4:1, 5% w/w of a thickener (Rhodopol® 23 pregelled at 2.7% w/w in water and containing 1 g of Proxel® GXL as antimould agent), water for the remaining part up to 100% w/w.

60 parts by weight of component B) are added under low stirring to 40 parts by weight of the capsule suspension A) described in step a). The concentration of lambda-cyhalothrin in the so obtained composition is equal to 100 g/l and the ratio solvent Biodiesel of component B)/a.i. of component A) is equal to 1:1.

Example 16

Efficacy of Insecticide Compositions

The efficacy of different compositions of insecticide active ingredients (a.i.) against *Aphis fabae* (Af test) and *Cydia pomonella* (Codling moth) (Cp test) was evaluated.

The following compositions were tested.

Formulation 16A:
  a capsule suspension A) prepared according to step a) of example 15;
  a composition A)+B) prepared as described in step b) of example 15.

Formulation 16B:
  a commercial formulation A)', namely Pyrinex containing microencapsulated Chlorpyrifos (250 g/l);
  a composition A)'+B) prepared by adding to the formulation A)' above component B) of step b) of example 6. The ratio of the solvent of component B)/a.i. of component A)' is 1:4.

The compositions A), A)', A)+B) and A)'+B) are diluted with water until obtaining an a.i. concentration equal to 250 mg/l.

The protocols and results of efficacy trials are reported in example 16A for the *Aphis fabae* (Af test) and in example 16B for the *Cydia pomonella* (Cp test).

Example 16A

Efficacy Trials on *Aphis fabae* (Af Test)

The *Aphis fabae* Test (Af test) was performed according to the procedure described in the characterization, using a Potter Precision Laboratory Spray Tower.

Table 1 reports the dosages and a.i. concentrations of the formulations used in this example 16A based on lambda-cyhalothrin.

TABLE 1

| Formulations | N° replicate | N° insects/ replicate | ml product/ha | g a.i./ha |
|---|---|---|---|---|
| Suspension A) | 3 | 10 | 50.00 | 5.00 |
| Suspension A) | 3 | 10 | 25.00 | 2.50 |
| Suspension A) | 3 | 10 | 12.50 | 1.25 |
| Suspension A) | 3 | 10 | 6.30 | 0.63 |
| Suspension A) | 3 | 10 | 3.20 | 0.32 |
| Composition A) + B) | 3 | 10 | 50.00 | 5.00 |
| Composition A) + B) | 3 | 10 | 25.00 | 2.50 |
| Composition A) + B) | 3 | 10 | 12.50 | 1.25 |
| Composition A) + B) | 3 | 10 | 6.30 | 0.63 |
| Composition A) + B) | 3 | 10 | 3.20 | 0.32 |
| Suspension A)' | 3 | 10 | 20.00 | 5.00 |
| Suspension A)' | 3 | 10 | 10.00 | 2.50 |
| Suspension A)' | 3 | 10 | 5.00 | 1.25 |
| Suspension A)' | 3 | 10 | 2.50 | 0.63 |
| Suspension A)' | 3 | 10 | 1.25 | 0.32 |
| Composition A)' + B) | 3 | 10 | 25.00 | 5.00 |
| Composition A)' + B) | 3 | 10 | 12.50 | 2.50 |

TABLE 1-continued

| Formulations | N° replicate | N° insects/ replicate | ml product/ha | g a.i./ha |
|---|---|---|---|---|
| Composition A)' + B) | 3 | 10 | 6.30 | 1.25 |
| Composition A)' + B) | 3 | 10 | 3.20 | 0.63 |
| Composition A)' + B) | 3 | 10 | 1.60 | 0.32 |
| Untreated Control | 3 | 10 | 0.00 | 0.00 |

The results of the test (Af test) are reported in Table 3 as mortality assessment 24 hrs after treatment.

In Table 3:

% Corrected Mortality=[(Mt−Mc)/(100−Mc)]×100 wherein

Mt=% mortality of treated sample

Mc=% mortality of untreated sample (untreated control)

TABLE 3

| Formulations | Dose g a.i./ha | N° Treated | N° dead | % Mortality | % Corrected Mortality |
|---|---|---|---|---|---|
| Suspension A) | 2.50 | 30 | 18 | 60.00 | 55.56 |
| Suspension A) | 1.25 | 30 | 9 | 30.00 | 22.22 |
| Suspension A) | 0.63 | 30 | 9 | 30.00 | 22.22 |
| Suspension A) | 0.32 | 30 | 6 | 20.00 | 11.11 |
| Composition A) + B) | 2.50 | 30 | 21 | 70.00 | 66.67 |
| Composition A) + B) | 1.25 | 30 | 15 | 50.00 | 44.44 |
| Composition A) + B) | 0.63 | 30 | 18 | 60.00 | 55.56 |
| Composition A) + B) | 0.32 | 30 | 12 | 40.00 | 33.33 |
| Suspension A)' | 5.00 | 30 | 6 | 20.00 | 11.11 |
| Suspension A)' | 2.50 | 30 | 6 | 20.00 | 11.11 |
| Suspension A)' | 1.25 | 30 | 6 | 20.00 | 11.11 |
| Composition A)' + B) | 5.00 | 30 | 24 | 80.00 | 77.78 |
| Composition A)' + B) | 2.50 | 30 | 12 | 40.00 | 33.33 |
| Composition A)' + B) | 1.25 | 30 | 9 | 30.00 | 22.22 |
| Untreated Control | 0.00 | 30 | 3 | 10.00 | Na |

The composition A)+B) has proved to be more effective than suspension A) alone 24 hours after treatment. Furthermore, the $LD_{50}$ values were as follows:

$LD_{50}$ value for A) is 1.56 g a.i./ha, $LD_{50}$ value for A)+B) is 0.66 g a.i./ha.

The results of $LD_{50}$ confirm that the composition A)+B) is much more effective than A) alone.

The composition A)'+B) has proved to be more effective than the suspension A)' alone 24 hours after treatment. Furthermore, the $LD_{50}$ values were as follows:

$LD_{50}$ value for A)' is >5.00 g a.i./ha, $LD_{50}$ value for A)'+B) is 2.50 g a.i./ha.

The results of $LD_{50}$ confirm that the composition A)'+B) has a more improved insecticide activity compared to A)' alone.

Example 16B

Efficacy Trials on *Cydia pomonella* (Codling Moth) (Cp Test)

*Cydia pomonella* test (Cp test) was carried out according to the following procedure. In a small chamber, with an area of 174 mm² filled with a semi-synthetic media formed essentially by Agar and flours, were distributed the products in a water suspension (50 μl/174 mm²). Insect mortality was recorded at 24 hours after treatment (AT).

The experimental test conditions were the following:
  temperature: 25° C.±2° C.
  relative humidity: 60-90%
  photoperiod: 16 h light and 8 darkness The dosages and a.i. concentrations of the formulations of example 16B based on Chlorpyrifos tested on *Cydia pomonella* (Cp test) are reported in Table 4.

TABLE 4

| Formulations | N° replicate | N° insects/replicate | mL product/ha | g a.i./ha |
|---|---|---|---|---|
| Suspension A)' | 2 | 16 | 40.00 | 10.00 |
| Suspension A)' | 2 | 16 | 20.00 | 5.00 |
| Suspension A)' | 2 | 16 | 10.00 | 2.50 |
| Suspension A)' | 2 | 16 | 5.00 | 1.25 |
| Suspension A)' | 2 | 16 | 2.50 | 0.625 |
| Suspension A)' + B) | 2 | 16 | 50.00 | 10.00 |
| Suspension A)' + B) | 2 | 16 | 25.00 | 5.00 |
| Suspension A)' + B) | 2 | 16 | 12.50 | 2.50 |
| Suspension A)' + B) | 2 | 16 | 6.25 | 1.25 |
| Suspension A)' + B) | 2 | 16 | 3.125 | 0.625 |
| Untreated Control | 2 | 32 | 0.00 | 0.00 |

The results of the *Cydia pomonella* (Cp test) of example 16B are reported in Table 6 as the mortality assessment at 24 hrs after treatment.

TABLE 6

| Formulations | Dose g a.i./ha | N° Treated | N° dead | % Mortality | % Corrected Mortality |
|---|---|---|---|---|---|
| Suspension A)' | 10.00 | 32 | 14 | 43.75 | 41.94 |
| Suspension A)' | 5.00 | 32 | 8 | 25.00 | 22.58 |
| Suspension A)' | 2.50 | 32 | 2 | 6.25 | 3.23 |
| Suspension A)' | 1.25 | 32 | 0 | 0.00 | 0.00 |
| Suspension A)' | 0.625 | 32 | 0 | 0.00 | 0.00 |
| Composition A)' + B) | 10.00 | 32 | 30 | 93.75 | 93.55 |
| Composition A)' + B) | 5.00 | 32 | 26 | 81.25 | 80.65 |
| Composition A)' + B) | 2.50 | 32 | 18 | 56.25 | 54.84 |
| Composition A)' + B) | 1.25 | 32 | 8 | 25.00 | 22.58 |
| Composition A)' + B) | 0.625 | 32 | 4 | 12.50 | 9.68 |
| Untreated Control | 0.00 | 32 | 2 | 3.125 | 3.125 |

The composition A)'+B) has proved to be more effective than A)' alone at 24 hours after treatment. Furthermore, the $LD_{50}$ values were as follows:

$LD_{50}$ value for A)' is 11.16 g a.i./ha;
$LD_{50}$ value for A)'+B) is 2.30 g a.i./ha.

The results of $LD_{50}$ show that the composition A)'+B) has a higher insecticide action compared to A)' alone.

Example 17

Efficacy of Herbicide Compositions

The herbicide activity, tested in pre- and post-emergence, of different compositions against *Rumex acetosa* and *Allium tuberosum* has been evaluated. The following compositions were tested in order to compare their efficacy.

The first composition (with its comparison) is as follows:
 a capsule suspension A) prepared as described in example 1, containing Oxyfluorfen (concentration of active 180 g/l);
 a composition A)+B) formed of the above A) plus component B) obtained in step b) of example 1. 90 parts by weight of A) The amount of B) added to A) allows to obtain an active ingredient concentration equal to 150 g/l and a weight ratio between solvent of component B)/a.i. of component A) equal to 0.6:1.

The second composition is as follows:
 a composition A)'+B), constituted by 76 parts of a commercial suspension A)' of microencapsulated Pendimethalin (31.7% w/w), namely Most Micro, and 24 parts of B), as described in step b) of example 1. The weight ratio between the solvent of component B) and the active ingredient of component A) is equal to 1:1.

The third composition is as follows:
 a composition A)'+B)', constituted by 44 parts of a commercial suspension A)' as defined under the second composition and 56 parts of B), as obtained in step b) of example 1. The weight ratio between the solvent of component B) and the active ingredient of component A) is equal to 4:1.

The compositions A), A)', A)+B), A)'+B) and A)'+B)' above were diluted with water until obtaining an a.i. concentration equal to 250 mg/l.

The protocols and results of efficacy trials are reported in example 17A for the post-emergence test and in example 17B for the pre-emergence test.

Example 17A

The post-emergence test was performed according to the following procedure. Plants were grown from seed to the 2 to 4 true leaf stage. Test composition is sprayed on the plants and leaf surfaces. The pots were irrigated with a water nutrient source located at the bottom of each pot. The plants will grow in non-porous plastic pots with a tray under the pot. The pots were large enough to allow normal growth and limit overlap of leaves among plants.

Untreated control plants and treated plants were kept under the same environmental conditions.

All spray solutions were prepared with deionised water on the same day of application.

They were applied with an appropriate spraying equipment, calibrated in order to provide an output of 400 l/ha. The status of the plants was then evaluated in comparison with that of untreated control plants regarding the effects on vigour and growth at 7, 14 and 21 days after application (% mortality).

The fresh shoot weight (Biomass) at 21 days after treatment was evaluated. The phytotoxicity was tested in terms of visual detrimental effects (chlorosis, necrosis, wilting leaf and stem deformations mortality).

The above tests were performed in greenhouse under controlled climatic conditions as follows:
 temperature: 22±10° C.;
 photoperiod: 16 h light 8 h darkness;
 relative Humidity: 70±25%;
 light intensity: luminance of 350±50 µE/m²/s.

Temperature, humidity, carbon dioxide concentration and light intensity were measured continuously with a data logger system.

Table 7 reports the concentrations and formulations tested of example 17A.

TABLE 7

| Formulations | N° replicate | N° plants/replicate | g a.i./ha |
|---|---|---|---|
| Suspension A) | 2 | 10 | 240 |
| Suspension A) | 2 | 10 | 120 |
| Suspension A) | 2 | 10 | 60 |
| Composition A) + B) | 2 | 10 | 240 |
| Composition A) + B) | 2 | 10 | 120 |
| Composition A) + B) | 2 | 10 | 60 |
| Composition A)' + B) | 2 | 10 | 1095 |
| Composition A)' + B) | 2 | 10 | 547.5 |
| Composition A)' + B) | 2 | 10 | 273.75 |

TABLE 7-continued

| Formulations | N° replicate | N° plants/replicate | g a.i./ha |
|---|---|---|---|
| Composition A)' + B)' | 2 | 10 | 1095 |
| Composition A)' + B)' | 2 | 10 | 547.5 |
| Composition A)' + B)' | 2 | 10 | 273.75 |
| Untreated Control | 2 | 10 | 0.00 |

The results of the post-emergence test are reported in Tables 8 and 9. Table 8 reports the % mortality on *Rumex acetosa* in a post-emergence treatment by using A), A)+B), A)'+B) and A)'+B)'.

TABLE 8

| Formulation | After 7 days | After 14 days | After 21 days |
|---|---|---|---|
| Untreated | 0 | 0 | 0 |
| Suspension A) (a.i. 60 g/ha) | 35 | 35 | 45 |
| Suspension A) (a.i. 120 g/ha) | 80 | 80 | 80 |
| Suspension A) (a.i. 240 g/ha) | 85 | 90 | 95 |
| Composition A) + B) (a.i. 60 g/ha) | 85 | 85 | 85 |
| Composition A) + B) (a.i. 120 g/ha) | 100 | 100 | 100 |
| Composition A) + B) (a.i. 240 g/ha) | 100 | 100 | 100 |
| Composition A)' + B) (a.i. 237.75 g/ha) | — | 0 | 10 |
| Composition A)' + B) (a.i. 547.5 g/ha) | — | 10 | 15 |
| Composition A)' + B) (a.i. 1095 g/ha) | — | 30 | 40 |
| Composition A)' + B)' (a.i. 237.75 g/ha) | — | 5 | 15 |
| Composition A)' + B)' (a.i. 547.5 g/ha) | — | 30 | 35 |
| Composition A)' + B)' (a.i. 1095 g/ha) | — | 35 | 55 |

Table 9 reports the % mortality on *Allium tuberosum* in a post-emergence treatment by using A), A)+B), A)'+B) and A)'+B)'.

TABLE 9

| Formulation | After 7 days | After 14 days | After 21 days |
|---|---|---|---|
| Untreated | 0 | 0 | 0 |
| Suspension A (a.i. 60 g/ha) | 0 | 0 | 0 |
| Suspension A (a.i. 120 g/ha) | 0 | 15 | 15 |
| Suspension A (a.i. 240 g/ha) | 10 | 10 | 15 |
| Composition A) + B) (a.i. 60 g/ha) | 5 | 10 | 10 |
| Composition A) + B) (a.i. 120 g/ha) | 10 | 20 | 20 |
| Composition A) + B) (a.i. 240 g/ha) | 30 | 30 | 30 |
| Composition A)' + B) (a.i. 237.75 g/ha) | — | — | — |
| Composition A)' + B) (a.i. 547.5 g/ha) | — | — | 10 |
| Composition A)' + B) (a.i. 1095 g/ha) | — | 10 | 15 |
| Composition A)' + B)' (a.i. 237.75 g/ha) | — | — | 5 |
| Composition A)' + B)' (a.i. 547.5 g/ha) | — | 5 | 10 |
| Composition A)' + B)' (a.i. 1095 g/ha) | — | 10 | 20 |

The results obtained in the post-emergence test show that the composition A)+B) is more effective on *Rumex acetosa* and *Allium tuberosum* in terms of mortality than A) alone.

The results obtained in the post-emergence test show that the composition A)'+B)' (ratio solvent of component B)/a.i. of component A)=4:1) is more effective on *Rumex acetosa* and *Allium tuberosum* in terms of mortality than A)'+B) (ratio solvent of component B)/a.i. of component A)=1:1).

Biomass

The biomass, the measured fresh shoot weight data at 21 days after post-emergence treatment, is reported in Table 10.

TABLE 10

| | Suspension A) | | | |
|---|---|---|---|---|
| Species | Untreated Weight (g) | Weight (g) 60 g/ha | Weight (g) 120 g/ha | Weight (g) 240 g/ha |
| *Rumex acetosa* | 12.66 | 1.00 | 0.67 | 0.53 |
| *Allium tuberosum* | 4.99 | 4.99 | 4.64 | 3.54 |

| | Composition A) + B) | | | |
|---|---|---|---|---|
| Species | Untreated Weight (g) | Weight (g) 60 g/ha | Weight (g) 120 g/ha | Weight (g) 240 g/ha |
| *Rumex acetosa* | 12.66 | 0.37 | 0 | 0 |
| *Allium tuberosum* | 4.99 | 4.13 | 3.81 | 2.69 |

| | Composition A)' + B) | | | |
|---|---|---|---|---|
| Species | Untreated Weight (g) | Weight (g) 273.8 g/ha | Weight (g) 547.5 g/ha | Weight (g) 1095 g/ha |
| *Rumex acetosa* | 12.66 | 8.14 | 6.6 | 5.29 |
| *Allium tuberosum* | 4.99 | 5.05 | 4.97 | 4.33 |

The results obtained in the post-emergence test show that the test composition A)'+B) is more effective on the *Rumex acetosa* and the *Allium tuberosum* in terms of biomass than A) alone.

Phytotoxicity

The phytotoxicity, in terms of chlorosis, necrosis and reduction growth, was observed at 7, 14 and 21 days and reported in Table 11 on *Rumex acetosa* in a post-emergence trearment, and in Table 12 on *Allium tuberosum* in a post-emergence trearment.

In Tables 11 and 12 the meaning of the abbreviations are as follows:
H=Growth reduction
C=Chlorosis
N=Necrosis
no=no phytotoxicity

TABLE 11

| Formulation | After 7 days | After 14 days | After 21 days |
|---|---|---|---|
| Untreated | no | no | no |
| Suspension A (a.i. 60 g/ha) | no | N, C | N, C |
| Suspension A (a.i. 120 g/ha) | N | C | C |
| Suspension A (a.i. 240 g/ha) | N | N, C | N, C |
| Composition A) + B) (a.i. 60 g/ha) | N | no | no |
| Composition A) + B) (a.i. 120 g/ha) | no | no | no |
| Composition A) + B) (a.i. 240 g/ha) | no | no | no |
| Composition A)' + B) (a.i. 237.75 g/ha) | H | no | no |
| Composition A)' + B) (a.i. 547.5 g/ha) | N, H | H | H |
| Composition A)' + B) (a.i. 1095 g/ha) | N, C, H | no | no |
| Composition A)' + B)' (a.i. 237.75 g/ha) | no | no | no |
| Composition A)' + B)' (a.i. 547.5 g/ha) | H | H | H |
| Composition A)' + B)' (a.i. 1095 g/ha) | C, N, H | C, N, H | C, N, H |

TABLE 12

| Formulation | After 7 days | After 14 days | After 21 days |
|---|---|---|---|
| Untreated | no | no | no |
| Suspension A (a.i. 60 g/ha) | no | no | no |
| Suspension A (a.i. 120 g/ha) | no | no | no |
| Suspension A (a.i. 240 g/ha) | N, C, H | H | H |
| Composition A) + B) (a.i. 60 g/ha) | N, C | N, C | N, C |
| Composition A) + B) (a.i. 120 g/ha) | N, C | N, C, H | N, C, H |
| Composition A) + B) (a.i. 240 g/ha) | N, C, H | N, C, H | N, C, H |
| Composition A)' + B) (a.i. 237.75 g/ha) | no | no | no |
| Composition A)' + B) (a.i. 547.5 g/ha) | no | no | no |

TABLE 12-continued

| Formulation | After 7 days | After 14 days | After 21 days |
|---|---|---|---|
| Composition A)' + B) (a.i. 1095 g/ha) | no | N | N |
| Composition A)' + B)' (a.i. 237.75 g/ha) | no | no | no |
| Composition A)' + B)' (a.i. 547.5 g/ha) | C | C | C, H |
| Composition A)' + B)' (a.i. 1095 g/ha) | C | C, N, H | C, N, H |

The results reported in Tables 11 and 12 in the post-emergence test show that the compositions A)+B) is more effective on the Rumex acetosa and Allium tuberosum in terms of phytotoxicity than A) alone.

The results of the composition A)'+B)' (ratio solvent of component B)/a.i. of component A)=4:1) is more effective on *Rumex acetosa* and *Allium tuberosum* in terms of phytotoxicity than A)'+B) (ratio solvent of component B)/a.i. of component A)=1:1).

Example 17B

The pre-emergence test was performed according to the following procedure. Seeds were placed in contact with soil treated with the test substance. The pots were irrigated with a water nutrient source located at the bottom of each pot. The plants will grow in non-porous plastic pots with a tray under the pot. The pots were large enough to allow normal growth and limit overlap of leaves among plants.

Untreated control plants and treated plants were kept under the same environmental conditions.

All spray solutions were prepared with deionised water on the day of application.

Test solutions were applied by means of an appropriate spraying equipment, calibrated in order to provide an output of 400 l/ha. The measured endpoints were visual assessment of seedling emergence (% emergence), fresh shoot weight at 21 days after treatment (biomass) and visual detrimental effects evaluated as chlorosis, mortality, plant development abnormalities (phytotoxicity).

The above tests were performed in greenhouse under controlled climatic conditions as follows:
temperature: 22±10° C.;
photoperiod: 16 h light 8 h darkness;
relative Humidity: 70±25%;
light intensity: luminance of 350±50 µE/m$^2$/s.

Temperature, humidity, carbon dioxide concentration and light intensity were measured continuously with a data logger system.

The concentrations and formulations tested of example 17B on *Rumex acetosa* and *Allium tuberosum* are reported in Table 13.

TABLE 13

| Formulations | N° replicate | N° plants/replicate | g a.s/ha |
|---|---|---|---|
| Suspension A) | 2 | 10 | 240 |
| Suspension A) | 2 | 10 | 120 |
| Suspension A) | 2 | 10 | 60 |
| Composition A) + B) | 2 | 10 | 240 |
| Composition A) + B) | 2 | 10 | 120 |
| Composition A) + B) | 2 | 10 | 60 |
| Untreated Control | 2 | 10 | 0.00 |

The results of the pre-emergence test (indicated as % of emergence) are reported in Table 14 for *Rumex acetosa* and in Table 15 for *Allium tuberosum*.

TABLE 14

| Formulation | After 7 days | After 14 days | After 21 days |
|---|---|---|---|
| Untreated | 20 | 35 | 70 |
| Suspension A) (a.i. 60 g/ha) | 20 | 20 | 20 |
| Suspension A) (a.i. 120 g/ha) | 20 | 20 | 15 |
| Suspension A) (a.i. 240 g/ha) | 10 | 10 | 0 |
| Composition A) + B) (a.i. 60 g/ha) | 20 | 20 | 7.14 |
| Composition A) + B) (a.i. 120 g/ha) | 20 | 15 | 7.5 |
| Composition A) + B) (a.i. 240 g/ha) | 10 | 5 | 0 |

TABLE 15

| Formulation | After 7 days | After 14 days | After 21 days |
|---|---|---|---|
| Untreated | 20 | 40 | 75 |
| Suspension A) (a.i. 60 g/ha) | 30 | 40 | 40 |
| Suspension A) (a.i. 120 g/ha) | 27 | 35 | 35 |
| Suspension A) (a.i. 240 g/ha) | 25 | 34 | 25 |
| Composition A) + B) (a.i. 60 g/ha) | — | 38 | 24 |
| Composition A) + B) (a.i. 120 g/ha) | — | 32 | 24 |
| Composition A) + B) (a.i. 240 g/ha) | 20 | 20 | 20 |

The results obtained in the pre-emergence test show that the composition A)+B) is more effective on the *Rumex acetosa* and *Allium tuberosum* than A) alone.

Biomass

The biomass, as measured fresh shoot weight data at 21 days after treatment, is reported in Table 16.

TABLE 16

| | Suspension A) | | | |
|---|---|---|---|---|
| Species | Untreated Weight (g) | Weight (g) 60 g/ha | Weight (g) 120 g/ha | Weight (g) 240 g/ha |
| Rumex acetosa | 0.5 | 0.24 | 0.16 | 0 |
| Allium tuberosum | 1.28 | 1.07 | 0.99 | 0.82 |

| | Composition A) + B) | | | |
|---|---|---|---|---|
| Species | Untreated Weight (g) | Weight (g) 60 g/ha | Weight (g) 120 g/ha | Weight (g) 240 g/ha |
| Rumex acetosa | 0.5 | 0.17 | 0.09 | 0 |
| Allium tuberosum | 1.28 | 0.92 | 0.86 | 0.70 |

The results of biomass in the pre-emergence test show that the composition A)+B) is more effective on the *Rumex acetosa* and *Allium tuberosum* than A).

Phytotoxicity

The phytotoxixity, evaluated as chlorosis and necrosis, observed at 14 and 21 days, is reported in Table 17 for *Rumex acetosa* and in Table 18 for *Allium tuberosum*.

In the Tables
H=Growth reduction
C=Chlorosis
N=Necrosis
no=no phytotoxicity

TABLE 17

| Formulation | After 14 days | After 21 days |
|---|---|---|
| Untreated | no | no |
| Suspension A (a.i. 60 g/ha) | no | no |
| Suspension A (a.i. 120 g/ha) | N | N |

TABLE 17-continued

| Formulation | After 14 days | After 21 days |
| --- | --- | --- |
| Suspension A (a.i. 240 g/ha) | N | N |
| Composition A) + B) (a.i. 60 g/ha) | N | N |
| Composition A) + B) (a.i. 120 g/ha) | N | N |
| Composition A) + B) (a.i. 240 g/ha) | N | N |

TABLE 18

| Formulation | After 14 days | After 21 days |
| --- | --- | --- |
| Untreated | no | no |
| Suspension A (a.i. 60 g/ha) | no | no |
| Suspension A (a.i. 120 g/ha) | no | no |
| Suspension A (a.i. 240 g/ha) | no | no |
| Composition A) + B) (a.i. 60 g/ha) | N | N |
| Composition A) + B) (a.i. 120 g/ha) | C, N | C, N |
| Composition A) + B) (a.i. 240 g/ha) | C, N | C, N |

The results obtained in the pre-emergence test show that the composition A)+B) is more effective on *Rumex acetosa* and *Allium tuberosum* in terms of phytotoxicity than A) alone.

Example 18

Compositions Comprising Microcapsules Containing Bifenthrin Having a Controlled Release Step a): Preparation of Suspension A)

It was prepared according to step a) of example 12.

Step b): Preparation of Composition A)+B)

To 28.6 parts by weight of the suspension A) are added 1.5 parts by weight of the mixture B), obtained in step b) of example 9. The active ingredient content in the mixture [A)+B)]' is 9.5% w/w and the weight ratio between solvent of component B) and the a.i. of component A) is 0.42:1.

Analogously, a mixture [A)+B)]" is prepared by adding 14.30 parts by weight of B) to 28.6 parts by weight of A). The weight ratio between the solvent of component B) and the a.i. of component A) is 4:1 and the active ingredient is 6.7% w/w.

The capsules suspension A), mixtures [A)+B)]' and [A)+B)]" were diluted in water up to a concentration of 20 mg/l of active ingredient.

By using the procedure described in the characterization and n-hexane as solvent of extraction of the a.i., the amount of a.i. released from the microcapsules is determined by means of GC-ECD.

The results obtained are below reported.

| | | Solvent of B)/a.i | |
| --- | --- | --- | --- |
| | | — | 0.42:1 | 4:1 |
| Time (h) | A) (a.i. %) | [A) + B)]' (a.i. %) | [A) + B)]" (a.i. %) |
| 1 | n.d. | 19 | 36 |
| 6 | n.d. | 26 | 50 |
| 24 | 37 | 92 | 100 |

(n.d. means non detectable).

The results show that [A)+B)]' and [A)+B)]" are more effective than A) alone.

Example 19

Efficacy Trials

The compositions described in example 18 were tested on a susceptible strain of, using a Potter Tower, as described in the characterization. Approximately 15 adult females of *Aphis fabae* were placed on a Petri dish of 6 cm diameter. The suspension of microcapsules A) and the compositions [A)+B)]' and [A)+B)]" were diluted in water up to an applicative dosage of 3 g a.i./ha.

The treatments were performed at a pressure correspondent to 2.7 mbar using a volume of insecticide solution equal to 1.25 ml. Between each treatment and the following one, the Potter Tower was washed several times with demineralized water. The efficacy in terms of mortality of the aphids was evaluated after 1 hour, 6 hours and 24 hours.

The results are reported in Table 19.

TABLE 19

| | Mortality after 1 hr (%) | Mortality after 6 hrs (%) | Mortality after 24 hrs (%) |
| --- | --- | --- | --- |
| untreated | 0 | 0 | 0 |
| A) | 0 | 17.24 | 60.00 |
| [A) + B)]' | 53.33 | 66.67 | 100.00 |
| [A) + B)]" | 83.87 | 88.24 | 100.00 |

The results show that the efficacy of the compositions [A)+B)]' and [A)+B)]" is higher than that of the capsule suspension A). In particular, it is evident that, increasing the amount of B) added to A) ([A)+B)]" vs [A)+B)]'), the efficacy of the microencapsulated formulation is enhanced. This is in agreement with the release time evaluations reported in example 18.

The invention claimed is:

1. A method for increasing the release rate of microencapsulated active ingredients (a.i.) in agricultural application, comprising the following steps:
  I) preparation of an aqueous suspension A) comprising microcapsules of an active ingredient to improve their biological efficacy,
   wherein the active ingredient is at least one crop protection product selected from the group consisting of an herbicide, acaricide, insecticide, a fungicide, biocide, a plant and an insect growth regulator, and antidote;
  II) preparation of a water-emulsifiable liquid, component B), consisting of 90% w/w of a solvent of the microencapusulated active ingredient the solvent being inert with respect to the capsule shells and substantially immiscible with water, and 10% w/w of a 1:1 mixture of nonionic and anionic surfactants, wherein the solvent is at least one selected from the group consisting of:
   $C_9$-$C_{20}$ alkylbenzenes, wherein the alkyl is linear or branched;
   $C_1$-$C_4$ alkyl esters of $C_3$-$C_{14}$ dicarboxylic acids, or their mixtures;
   $C_3$-$C_{10}$ alkyl esters of $C_3$-$C_{10}$ carboxylic acids or hydroxyacids;
   methyl esters of $C_{12}$-$C_{22}$ saturated or unsaturated fatty acids or their mixtures; and
  III) providing water, component C), for diluting the active ingredient, and
  IV) mixing A), B) and C) and adjusting the ratio (by weight3 of the solvent in component B) over the active ingredient in component A to modify a release rate of the active ingredient by further adding component B), wherein by increasing the ratio by weight of the solvent of component B)/active ingredient of component A), the release rate of the active ingredient is increased, wherein the ratio by weight between the solvent of component B) and the active ingredient of component A) is between 0.5:1 and 40:1, wherein non-ionic surfactants are at least one selected from the group consisting of ethoxylated alkylarylphenols, ethoxylated fatty alcohols, ethoxylated castor oil, and ethoxylated sorbitan oleate, wherein the ethoxylated units are in the range 1-60, and wherein the anionic surfactants are selected from sulphonates and sulphosuccinates.

2. The method according to claim 1, wherein A) is added to B), or B) is added to A), and then the water of step III) is added.

3. The method according to claim 1, wherein the water of step III) is added to component A) alone and/or to component B) alone before obtaining the mixing of the three components.

4. The method according to claim 1, wherein the A)+B) is in the form of an aqueous suspo-emulsion, aqueous suspo-dispersion or aqueous suspo-microemulsion.

5. The method according to claim 1, wherein in step II) the component B) is in the form of an aqueous emulsion.

6. The method according to claim 1, wherein the solvent of the component B) shows an agrochemical activity lower than 70% on target species.

7. The method according to claim 1, wherein the suspension A) has an active ingredient concentration from 1% up to 60% w/w.

8. The method according to claim 1, wherein the microcapsules of suspensions A) has a shell of a polymeric membrane insoluble in water formed of polymers obtained by polycondensation and selected from the group consisting of polyam ides, polyesters, polyurethanes, and polyureas.

9. The method according to claim 1, wherein the herbicide is at least one selected from the group consisting of dinitroanilines, chloroacetamides, carbamates and diphenylethers.

10. The method according to claim 1, wherein the acaricide is selected from the METI class.

11. The method according to claim 1, wherein the insecticide is at least one selected from the group consisting of a pyrethroid, neonicotinoid, carbamate and an organophosphate.

12. The method according to claim 1, wherein the fungicide is at least one selected from the group consisting of an imidazole, a triazole and an anilinopyrimidine.

13. The method according to claim 1, wherein the active ingredient in the microcapsule is in admixture with other active ingredients of the same class or of different classes.

14. The method according to claim 1, wherein the microcapsules comprise solvents and activity modifiers.

15. The method according to claim 1, wherein the suspension A) comprises at least one other component selected from the group consisting of a dispersant, an excipient as a thickener, an antifoam, antifreeze, antimould agents, and activity modifiers.

16. A method according to claim 14, wherein the activity modifier is at least one selected from the group consisting of:
"safener", in case of herbicides;
PBO as a synergizing agent of the active ingredient in case of insecticides and fungicides, or in case of herbicides; and
a sexual pheromone, a cairomone, in case of insecticides.

17. The method according to claim 1, wherein the anionic surfactants are selected from dodecylbenzene sulphonates.

18. The method according to claim 8, wherein the polymeric membrane is formed of polyurea.

19. The method according to claim 9, wherein the herbicide is at least one selected from the group consisting of pendimethalin, trifluralin, alachlor, acetochlor, dimethenamide, metolachlor, pethoxamide, pretilachlor, molinate, triallate, EPTC, oxyfluorfen, flurochloridone, chlomazone, and dichlobenil.

20. The method according to claim 9, wherein the herbicide is oxyfluorfen.

21. The method according to claim 10, wherein the acaricide is selected from fenazaquin or pyridaben.

22. The method according to claim 11, wherein the insecticide is at least one selected from the group consisting of bifenthrin, α-cypermethrin, cypermethrin, deltamethrin, imiprothrin, γ-cyhalothrin, prallethrin, tetramethrin; phosmet, chlorpyriphos, naled, fenitrothion; imidachloprid; carbosulfan, pirimicarb, aldicarb, thiodicarb, carbofuran and propoxur.

23. The method according to claim 22, wherein the insecticide is at least one selected from the group consisting of bifenthrin α-cypermethrin, deltamethrin and γ-cyhalothrin.

24. The method according to claim 12, wherein the fungicide is at least one selected from the group consisting of imazalil, tetraconazole, tebuconazole, propiconazole and pyrimethanil.

25. The method according to claim 1, wherein the solvent comprises $C_{10}$-$C_{16}$ alkylbenzenes.

26. A composition for increasing the release rate of microencapsulated active ingredients (a.i.) in agricultural applications, the composition comprising a mixture of:
I) an aqueous suspension A) comprising microcapsules of an active ingredient to improve their biological efficacy,
wherein the active ingredient is at least one crop protection product selected from the group consisting of an herbicide, acaricide, insecticide, a fungicide, biocide, a plant and an insect growth regulator, and antidote;
II) a water-emulsifiable liquid, component B), consisting of 90% w/w of a solvent of the microencapusulated active ingredient the solvent being inert with respect to the capsule shells and substantially immiscible with water, and 10% w/w of a 1:1 mixture of nonionic and anionic surfactants,
wherein the solvent is at least one selected from the group consisting of:
$C_9$-$C_{20}$ alkylbenzenes and their mixtures, wherein the alkyl is linear or branched;
$C_1$-$C_4$ alkyl esters of $C_3$-$C_{14}$ dicarboxylic acids, or their mixtures;
$C_3$-$C_{10}$ alkyl esters of $C_3$-$C_{10}$ carboxylic acids or hydroxyacids;
methyl esters of $C_{12}$-$C_{22}$ saturated or unsaturated fatty acids or their mixtures; and
III) water, component C), for diluting the active ingredient, and
wherein a ratio by weight of the solvent in component B) over the active ingredient in component A is adjusted to modify a release rate of the active ingredient by further adding component B),
wherein by increasing the ratio by weight of the solvent of component B)/active ingredient of component A), the release rate of the active ingredient is increased, wherein the ratio by weight between the solvent of component B) and the active ingredient of component A) is between 0.5:1 and 40:1, wherein component B) optionally contains at least one activity modifiers selected from the group consisting of:

safeners (antidotes) in case of herbicides;

PBO as synergizing agent in case of insecticides, fungicides and herbicides; and sexual pherormones, cairomones, in case of insecticides;

wherein the non-ionic surfactants are at least one selected from the group consisting of ethoxylated alkylarylphenols, ethoxylated fatty alcohols, ethoxylated castor oil, and ethoxylated sorbitan oleate, wherein the ethoxylated units are in the range 1-60; and wherein the anionic surfactants are selected from sulphonates and sulphosuccinates.

27. A process for preparing the compositions of claim 26 comprising:

separatedly adding B) and A) to C), while maintaining C) under stirring until reaching an active ingredient concentration corresponding to an agronomically effective rate;

or adding B) to A), or adding A) to B), to obtain an undiluted mixture of A) and B), and diluting the undiluted mixture of A) and B) with C) until reaching an application rate of the active ingredient.

28. A composition for increasing the release rate of microencapsulated active ingredients (a.i.) in agricultural applications, the composition comprising a mixture of:

I) an aqueous suspension A) comprising microcapsules of an active ingredient to improve their biological efficacy, wherein the active ingredient is at least one crop protection product selected from the group consisting of an herbicide, acaricide, insecticide, a fungicide, biocide, a plant and an insect growth regulator, and antidote;

II) a water-emulsifiable liquid, component B), consisting of 90% w/w of a solvent of the microencapusulated active ingredient the solvent being inert with respect to the capsule shells and substantially immiscible with water, and 10% w/w of a 1:1 mixture of nonionic and anionic surfactants, wherein the solvent is at least one selected from the group consisting of:

$C_9$-$C_{20}$ alkylbenzenes and their mixtures, wherein the alkyl is linear or branched;

$C_1$-$C_4$ alkyl esters of $C_3$-$C_{14}$ dicarboxylic acids, or their mixtures;

$C_3$-$C_{10}$ alkyl esters of $C_3$-$C_{10}$ carboxylic acids or hydroxyacids;

methyl esters of $C_{12}$-$C_{22}$ saturated or unsaturated fatty acids or their mixtures; and wherein a ratio by weight of the solvent in component B) over the active ingredient in component A is adjusted to modify a release rate of the active ingredient by further adding component B), wherein by increasing the ratio by weight of the solvent of component B)/active ingredient of component A), the release rate of the active ingredient is increased, wherein the ratio by weight between the solvent of component B) and the active ingredient of component A) is between 0.5:1 and 40:1, wherein component B) optionally contains at least one activity modifiers selected from the group consisting of:

safeners (antidotes) in case of herbicides;

PBO as synergizing agent in case of insecticides, fungicides and herbicides; and sexual pherormones, cairomones, in case of insecticides;

wherein non-ionic surfactants are at least one selected from the group consisting of ethoxylated alkylarylphenols, ethoxylated fatty alcohols, ethoxylated castor oil, and ethoxylated sorbitan oleate, wherein the ethoxylated units are in the range 1-60; and wherein the anionic surfactants are selected from sulphonates and sulphosuccinates.

29. A composition according to claim 28 comprising:

A) a suspension of polyurea microcapsules comprising an herbicide,

B) a mixture containing $C_9$-$C_{20}$ alkylbenzenes and their mixtures and non-ionic and anionic surfactants;

wherein the ratio by weight between the solvent of B) and the active ingredient of A) is between 0.1:1 and 1:1.

30. The composition according to claim 29, wherein the composition is diluted to obtain an application rate of the active ingredient.

31. The composition according to claim 29, wherein the herbicide is oxyfluorfen.

32. The composition according to claim 29, wherein the ratio by weight between the solvent of B) and the active ingredient of A) is 0.8:1.

33. The composition according to claim 29, wherein the insecticide is γ-cyhalothrin.

34. The composition according to claim 29, wherein the ratio between the solvent(s) of B) and the active ingredient of A) is between 0.5:1 and 4:1.

35. The composition according to claim 29, wherein the ratio between the solvent(s) of B) and the active ingredient of A) is between 0.8:1 and 2:1.

* * * * *